United States Patent [19]

Dopp

[11] Patent Number: 4,999,265
[45] Date of Patent: Mar. 12, 1991

[54] ALKALINE CELLS CONTAINING FLUORESCENT DYES

[75] Inventor: Robert B. Dopp, Madison, Wis.

[73] Assignee: Rayovac Corporation, Madison, Wis.

[21] Appl. No.: 375,531

[22] Filed: Jul. 5, 1989

[51] Int. Cl.$^5$ .............................................. H01M 2/00
[52] U.S. Cl. ................................... 429/198; 429/206; 29/623.2
[58] Field of Search ..................... 429/90, 206, 198; 29/623.2

[56] References Cited

U.S. PATENT DOCUMENTS 4,052,536 10/1977 Lichtin ................................. 429/198
4,222,745 9/1980 Cloyd .................................... 429/90
4,675,300 6/1987 Zare et al. ........................ 204/180.1

FOREIGN PATENT DOCUMENTS 0148878 9/1982 Japan ..................................... 429/90
0068880 4/1983 Japan ..................................... 429/90
0184272 10/1983 Japan .................................... 429/90

Primary Examiner—Donald L. Walton
Attorney, Agent, or Firm—Kenyon & Kenyon

[57] ABSTRACT

An electrolytic composition is disclosed which comprises an electrolyte mixture and a fluorescent additive. The fluorescent additive should be stable at the pH of the electrolyte mixture. In the preferred embodiment the fluorescent additive is a pyrene compound at a concentration of 0.1% by weight of the final composition. An improved electrochemical cell is also disclosed which incorporates the electrolytic composition of the present invention. A method for detecting spillage or leakage of electrolyte during manufacture of such an electrochemical cell is also disclosed utilizing the fluorescent character of the electrolytic composition of the present invention.

22 Claims, 7 Drawing Sheets

CAPACITY MAINTENANCE

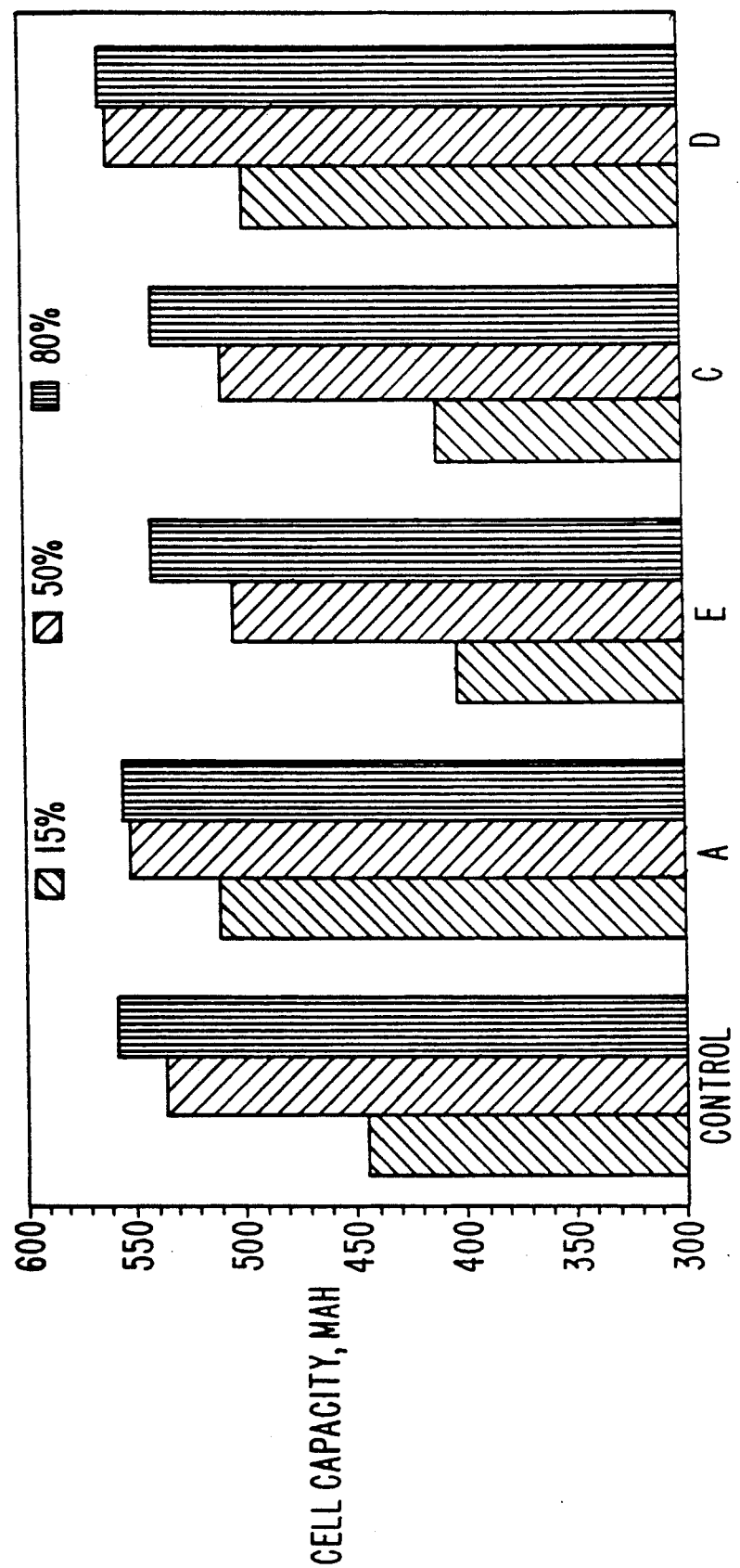

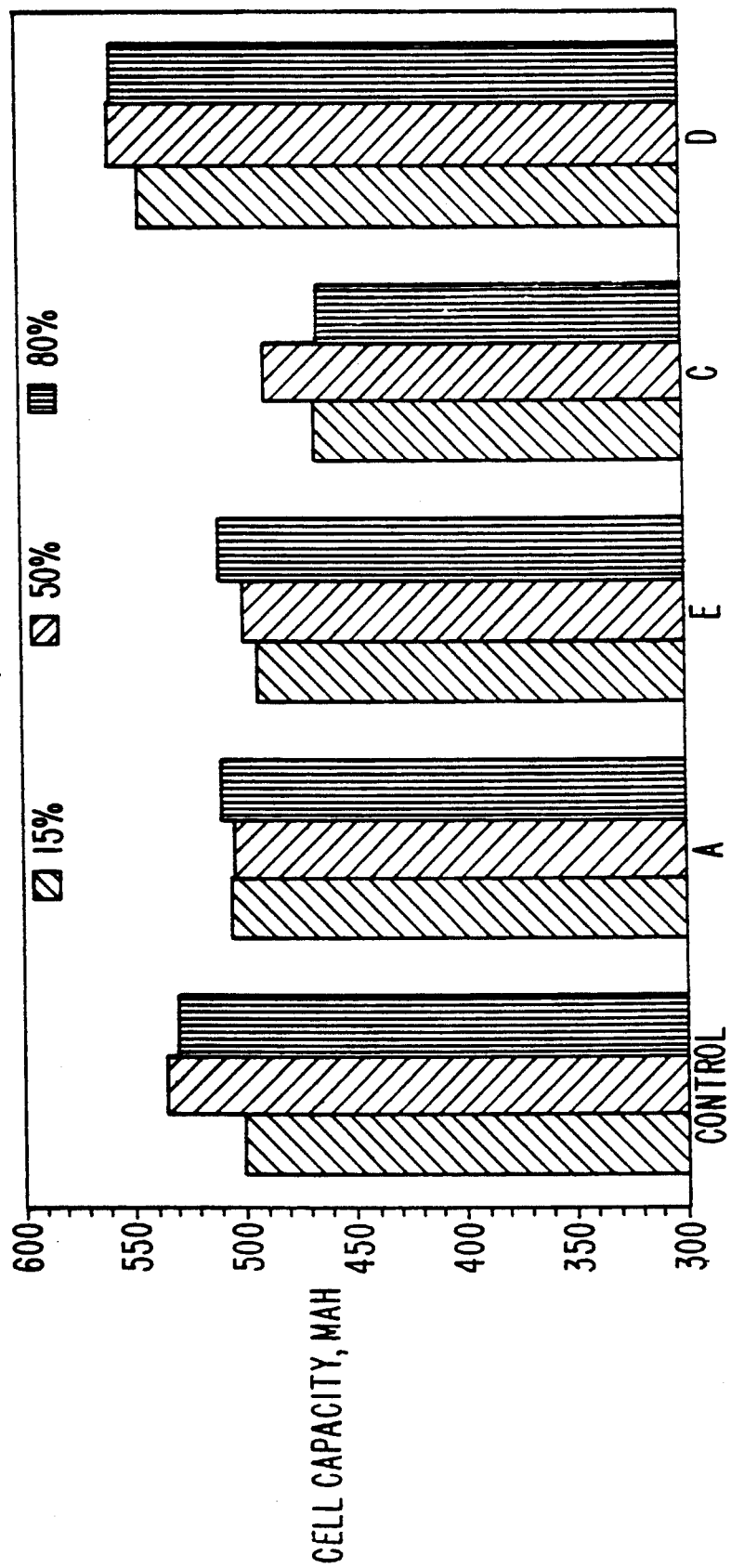

ALKALINE CELLS CONTAINING FLUORESCENT DYES

FIELD OF THE INVENTION

The present invention relates to electrochemical cells and electrolytes for use in such cells. In particular, the present invention relates to an electrolyte solution which contains a fluorescent agent which makes the electrolyte detectable by exposure to appropriate radiation and also increases cell capacity.

BACKGROUND OF THE INVENTION

The recent increase in small electronically powered devices has increased the demand for alkaline electrochemical cells. The most widely used types of alkaline cells are zinc air cells and zinc metal oxide cells.

Zinc air cells, or "button cells", are electrochemical cells wherein the oxygen in the air acts as the cathode material and amalgamated zinc is the anode material. Air enters the cell through ports in the cell which are immediately adjacent to a cathode assembly. The air diffuses into an air cathode subassembly where the oxygen is reacted. This air cathode subassembly generally consists of mixtures of activating chemicals supported by a complex physical structure. The cathode is in chemical contact with the cathode such that oxygen can diffuse into the electrolyte through a moisture barrier usually of a plasticlike material which is impervious to liquids (including the alkaline electrolyte). The oxygen then reacts with the water in the electrolyte consuming electrons and producing hydroxide ions. These ions then migrate through an electrical barrier which is transparent to liquid ions where they oxidize the metallic zinc, which is also in chemical contact with the electrolyte, generally producing two electrons for each atom of zinc reacted. Such cells are well known and are more fully discussed in references such as U.S. Pat. Nos. 3,149,900 (Elmore and Tanner), 3,276,909 (Moos) and 4,617,242 (Dopp).

Zinc air button cells are normally constructed in two steps. The anode section and the cathode section are usually separately assembled and the joined together prior to the cell being permanently sealed. Generally, the cathode section is contained in a topless, hollow metallic can with a small air entry hole in the can bottom. The air cathode subassembly, which is covered with a nonmetallic separator, is slightly compressed within the cathode section. The zinc anode section consists of a topless, hollow metallic can into which a measured amount of zinc is placed. The alkaline electrolyte is then metered directly onto the surface of the zinc. After the electrode sections have been made, they are joined by inverting the cathode section and placing it into the open end of the anode can. The button cell is then sealed, usually by crimping the edges into a nonmetallic grommet.

Zinc-metal oxide cells also employ zinc as an anode material. However, the cathode is a metal oxide, such as manganese dioxide or silver oxide, which is either compressed into a compacted pellet or finely dispersed in a gelatinous material. Zinc-metal oxide button cells are constructed much as the zinc air button cells described above. However, the air cathode is replaced by the metal oxide pellet or gel which is separate from the anode when the cell is assembled by a separator containing electrolyte.

Zinc-metal oxide cells are more commonly found in the form of cylindrical batteries. Cylindrical batteries are made by enclosing the metal oxide gel and electrolyte in a cylindrical "zinc can" which acts as the anode. The cathode gel and electrolyte are introduced into the zinc can such that the gel and electrolyte form separate layers, with the electrolyte layer separating the cathode gel from the zinc can such that both the cathode and anode are in chemical contact with the electrolyte. The can, electrolyte and/or cathode gel can be separated by barriers which are permeable to ions. A current collector, such as a carbon rod, is then inserted into the cathode gel. Terminals are then contacted with the can and the collector and the battery is encased in an insulating sleeve and/or metal, paper or polymer jacket.

Additional information relating to alkaline cells and their construction can be found in Vincent, "Modern Batteries: An Introduction to Electrochemical Power Sources" (Edward Arnold 1984), which is incorporated herein by reference.

In manufacturing alkaline cells, care must be taken during the assembly process to allow no paths for leakage of electrolyte from the cell, thus maintaining the integrity of cell function and structure and keeping the caustic electrolyte contained. Unfortunately, the mechanized processes for manufacturing these cells on occasion cause electrolyte to spill or escape from the cell. This is most likely to occur immediately prior to crimping the cell components tightly together and while the cell construction is inside the closing die. If leaks and spills are not prevented and surfaces of the cell become wetted by electrolyte, electrolyte will continue to leak from the cell regardless of the sealing technique used in the production process. Escaping electrolyte may also cause cells to stick to or in automatic equipment used in the manufacturing process (e.g., to the closing die) leading to equipment failure and manufacturing delays. The present invention provides reliable means for detecting the presence of even a very small quantity of electrolyte outside of a cell both before and after closure of the cell by providing a fluorescent electrolyte which is visible upon exposure to radiation.

Generally, it is also desirable to increase the capacity of cells whenever possible. It is, therefore, an additional object of the present invention to provide means for improving cell capacity.

SUMMARY OF THE INVENTION

In accordance with the present invention, an electrolytic composition useful for making alkaline electrochemical cells is disclosed which comprises an electrolyte mixture and a fluorescent additive. Although any fluorescent additive which is stable when included in the electrolyte mixture can be used, additives fluorescing in the visible spectrum are most advantageous since detection of the fluorescence can be made with the naked eye. Any fluorescent dye or other fluorescent compound can be used as the fluorescent additive which is stable and will fluoresce (upon stimulus), at the pH of the final electrolytic composition, which is usually above pH 13 for alkaline electrochemical cells.

In one embodiment the fluorescent additive is a pyrene compound, which is stable at pH 14, at a concentration of 0.1% by weight of the final composition. For the purpose of rendering the electrolyte detectable by making it fluorescent, any concentration of the fluorescent additive can be used which renders the electrolyte detectably fluorescent when present in the minimum quantity sought to be detected.

The electrolytic mixture can be any electrolyte useful for making electrochemical cells. In the embodiment discussed below, the electrolyte mixture is a water, potassium hydroxide (30% by weight), zinc oxide (2% by weight) mixture containing a siliconate additive (0.0142% by weight).

An improved alkaline electrochemical cell is also disclosed which incorporates the electrolytic composition of the present invention. The alkaline electrochemical cell comprises a cathode, a zinc anode and the electrolyte composition of the present invention in chemical contact with the cathode and the zinc anode. In "chemical contact" means simply that ions diffused in the electrolyte can reach and react with the relevant electrode material.

Finally, a method for detecting spillage or leakage of electrolyte during manufacture of such an electrochemical cell is also disclosed. The method comprises preparing an electrolytic composition in accordance with the present invention, adding the electrolytic composition to at least one structural component which forms the electrochemical cell (e.g., the anode can or zinc can), exposing the electrolytic composition and the structural component to a stimulus which will cause the fluorescent additive to fluoresce, such as ultraviolet light or black light, and detecting fluorescence of the fluorescent additive, thus revealing the presence of electrolyte. The stimulus can be provided and fluorescence can be detected either before closing and sealing the cell can to detect spillage of electrolyte on cell components or after closing and sealing the can to detect leakage of electrolyte from the cell.

BRIEF DESCRIPTION OF THE FIGURES

FIGS. 6 and 7 are graphs summarizing the comparative capacity maintenance of electrochemical cells made in accordance with the present invention and cells made without fluorescent additive under various conditions of relative humidity.

DETAILED DESCRIPTION OF THE INVENTION

In one embodiment of the present invention, the fluorescent additive is a pyrene compound (commercially available from Magnaflux Corp., 7300 W. Lawrence Ave., Chicago, IL. 60656, as ZLX-593). The pyrene compound is stable at high pH and fluoresces at yellow wavelengths, with strong absorption bands at 240, 300 and 460 nm and weak absorption bands at 370 and 390 nm.

An electrolyte mixture of potassium hydroxide and zinc oxide in water at 30% and 2% by weight, respectively, was prepared (stock standard electrolyte, pH 14). Dow Corning 193, an organic siliconate additive (silicon glycol copolymer surfactant, dimethicone copolyol described in U.S. Pat. No. 4,617,242) at a concentration of 0.0142%, 0.0355% or 0.142% as specified below was added to the electrolyte mixture. The mixture was stirred vigorously for 24 hours, then allowed to stand for one week. The clear lower fluid (stock methyl siliconate doped electrolyte) was physically separated from the oily upper surface layer.

A 10% by weight stock solution of the pyrene compound was prepared by dissolving the powdered compound in 30% potassium hydroxide. 99 parts of the KOH/zinc oxide/siliconate electrolyte mixture was combined with 1 part of the pyrene compound stock solution to yield the electrolyte composition of the present invention (final concentrations: 30% potassium hydroxide, 2% zinc oxide, 0.1% fluorescent additive, siliconate as described below). Alternatively, the fluorescent additive can be directly added to the electrolyte mixture as a powder.

With the exception of the addition of yellow fluorescence, the addition of the pyrene compound did not change the characteristics of the electrolyte mixture. The fluorescence of the resulting electrolyte mixture was strongly visible under a black light (i.e., ultraviolet light).

Figure 1:
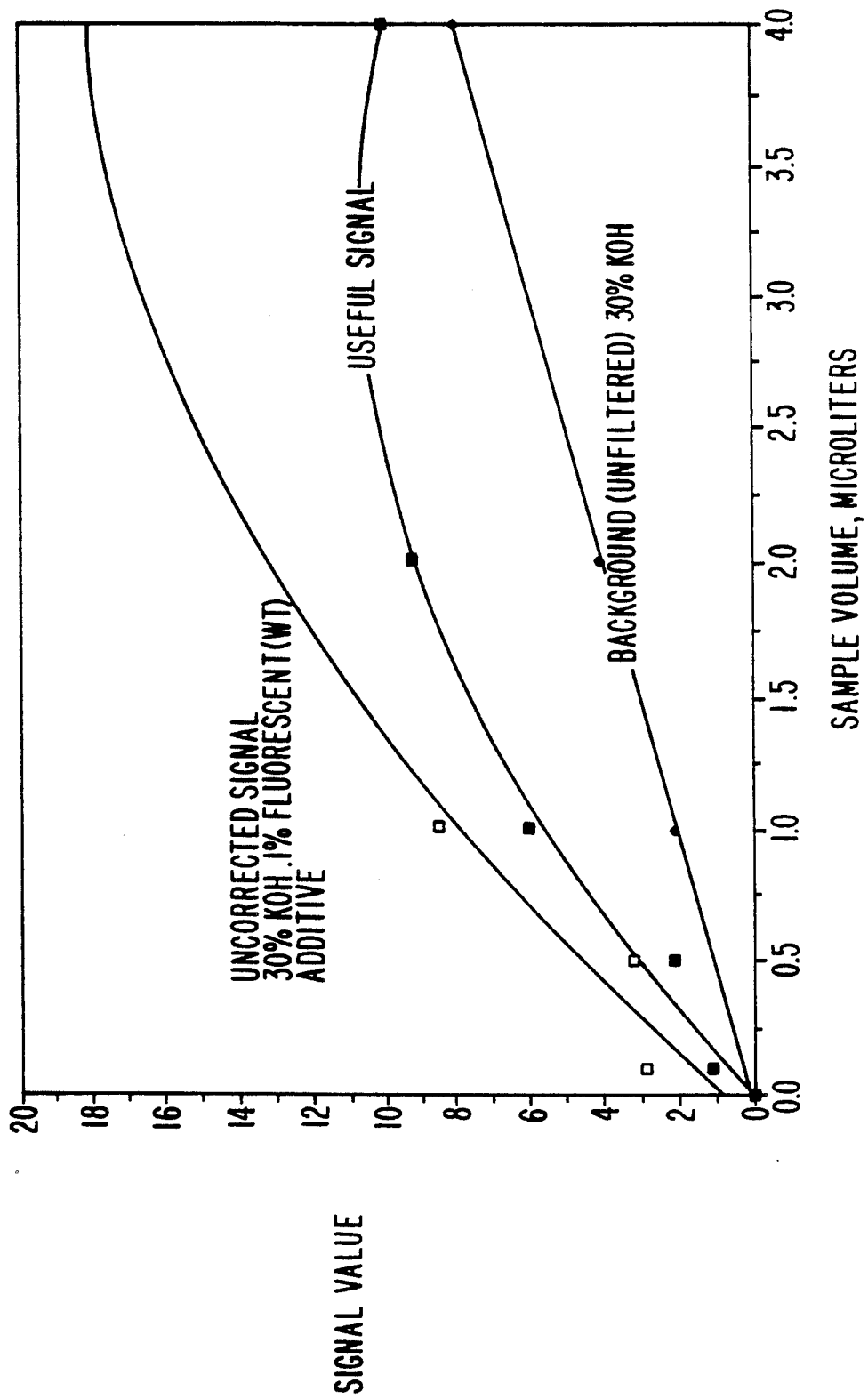
FIG. 1 is a graph showing the relative response to UV light of an electrolyte composition of the present invention as compared with a 30% potassium hydroxide, 2% zinc oxide electrolyte.

FIG. 1 is a graph showing the relative response to UV light of an electrolyte composition of the present invention as compared with a control 30% potassium hydroxide electrolyte (30% potassium hydroxide, 2% zinc oxide, 0.0355% siliconate additive). The electrolyte composition of the present invention gave a detectable ("useful") signal regardless of the volume of the sample tested. Thus, almost any leakage or spillage of electrolyte prepared in accordance with the present invention should be detectable. FIG. 1 also shows that electrolyte without fluorescent additive did not give any useful signal at any volume.

Cells manufactured in accordance with the present invention were tested for stray fluorescent electrolyte both before closing and sealing cells and after closing and sealing. Black light was used to provide the required stimulus to induce fluorescence of the fluorescent additive. Quantities of stray electrolyte as small as 0.1 ul were detected.

Zinc air cells were then assembled as described above and in U.S. Pat. No. 4,617,242 (the disclosure of which is incorporated herein by reference as if fully set forth) employing the electrolyte compositions described above. Cells were constructed as follows:

Control Cell: 30% potassium hydroxide, 2% zinc oxide, 0.0355% siliconate additive Test Cell Type A: 30% potassium hydroxide, 2% zinc oxide, 0.142% siliconate additive Test Cell Type B: 30% potassium hydroxide, 2% zinc oxide, 0.142% siliconate additive, 0.1% pyrene compound Test Cell Type C: 30% potassium hydroxide, 2% zinc oxide, 0.1% pyrene compound Test Cell Type D: 30% potassium hydroxide, 2% zinc oxide, 0.0355% siliconate additive, 0.1% pyrene compound Test Cell Type E: 30% potassium hydroxide, 2% zinc oxide Testing of these various cells disclosed that the addition of fluorescent additive in accordance with the present invention had the added advantage of increasing cell capacity maintenance when used in an electrolyte composition also containing the siliconate additive.

Figure 2:
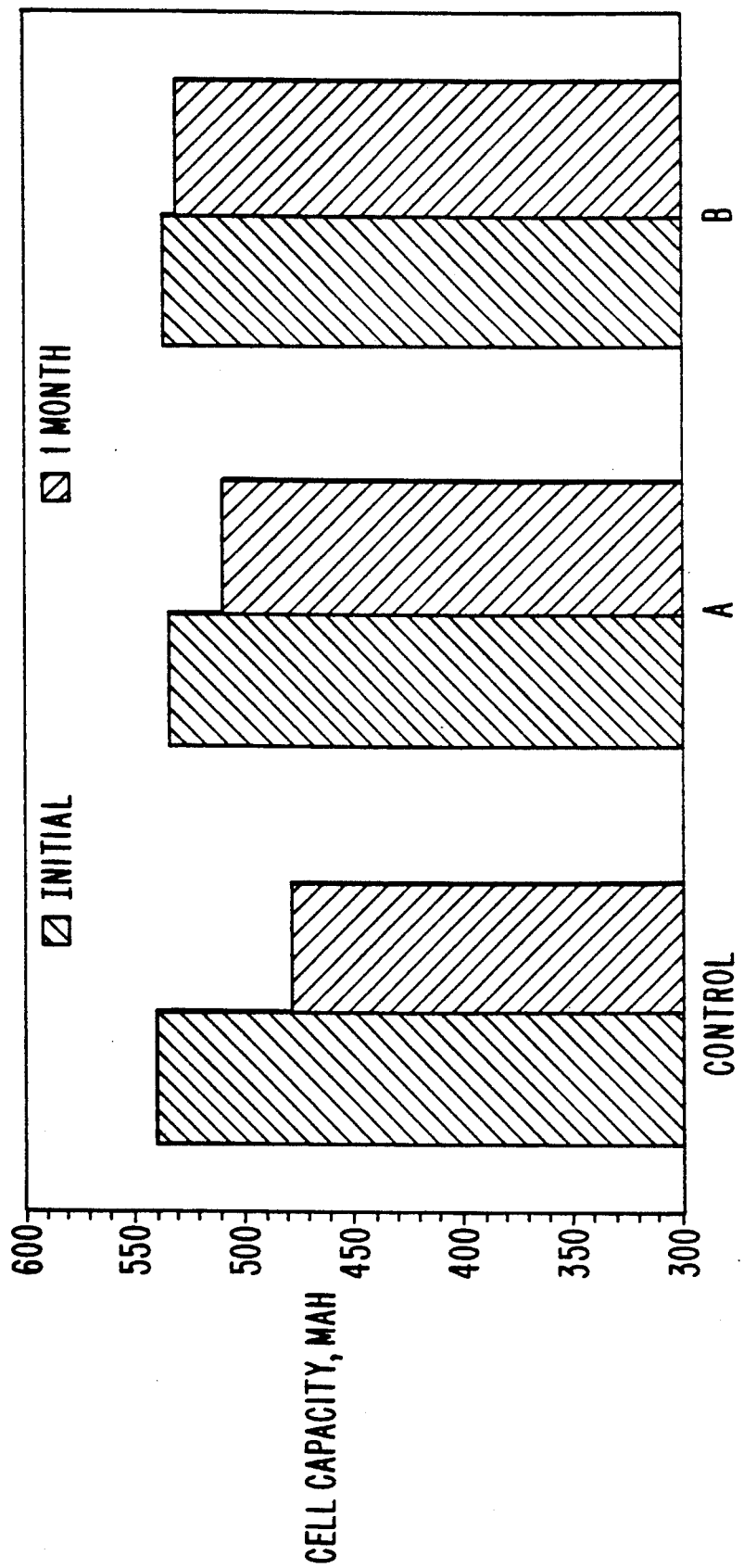
FIGS. 2 through 5 are graphs summarizing the comparative capacity maintenance of electrochemical cells made in accordance with the present invention and cells made without fluorescent additive.

FIGS. 2–7 summarize comparative test data on the control and test cells. FIG. 2 compares the capacity maintenance in milliampere hours ("MAH") (150 ohm load) of a control cell with that of Test Cell Types A and B initially and after one month of storage. The cell of the present invention containing both the fluorescent additive and the siliconate additive (0.142%) (Type B) maintained greater capacity after one month compared with the control cell and with a cell containing siliconate additive and having no fluorescent additive added (Type A).

Figure 3:
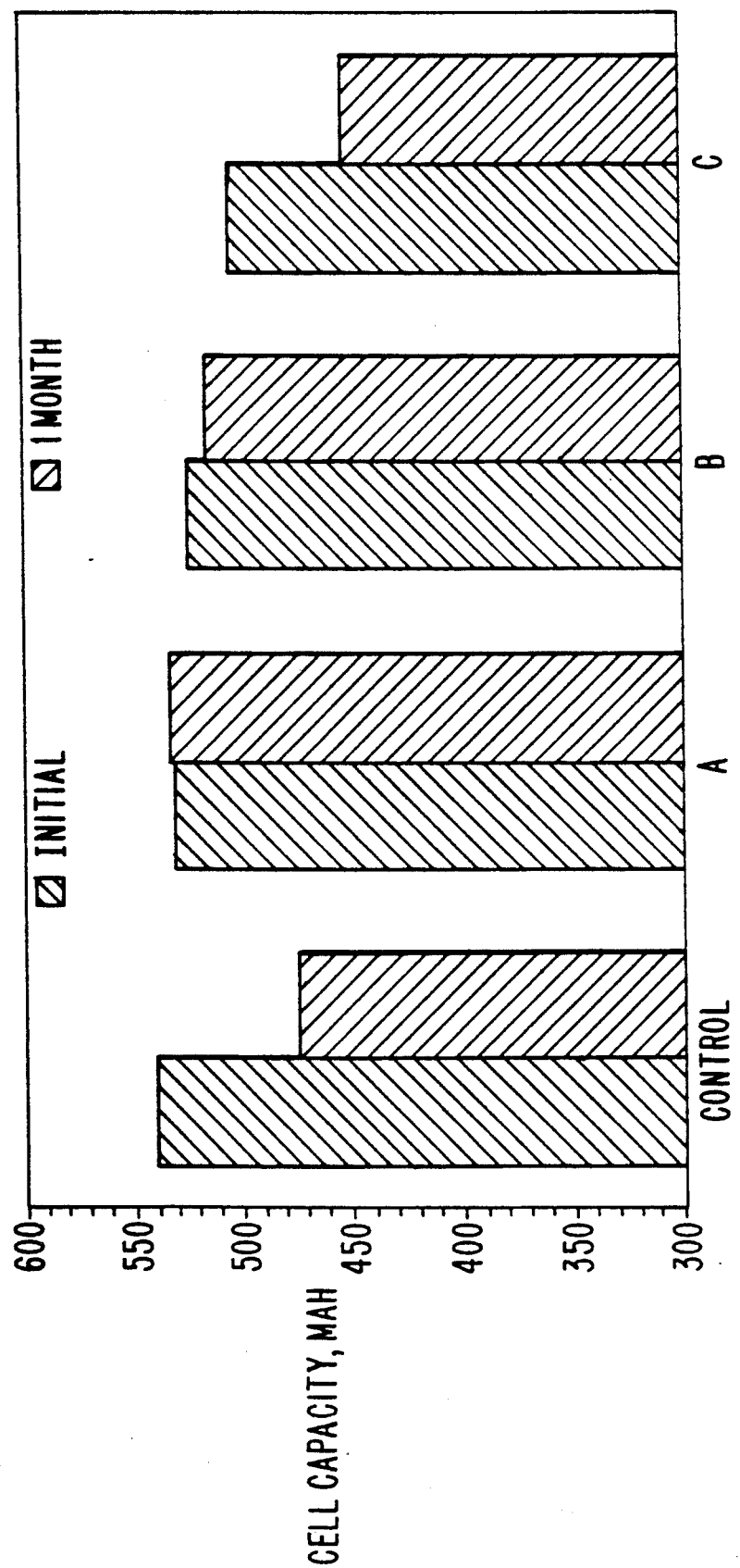

FIG. 3 compares the capacity maintenance (150 ohm load) of a control cell with that of different lots of Test Cell Types A, B and C. The cell of the present invention containing both the fluorescent additive and the siliconate additive (0.142%) (Type B) maintained greater capacity after one month compared with the control cell and with a cell containing the fluorescent additive and having no siliconate additive added (Type C).

Figure 4:
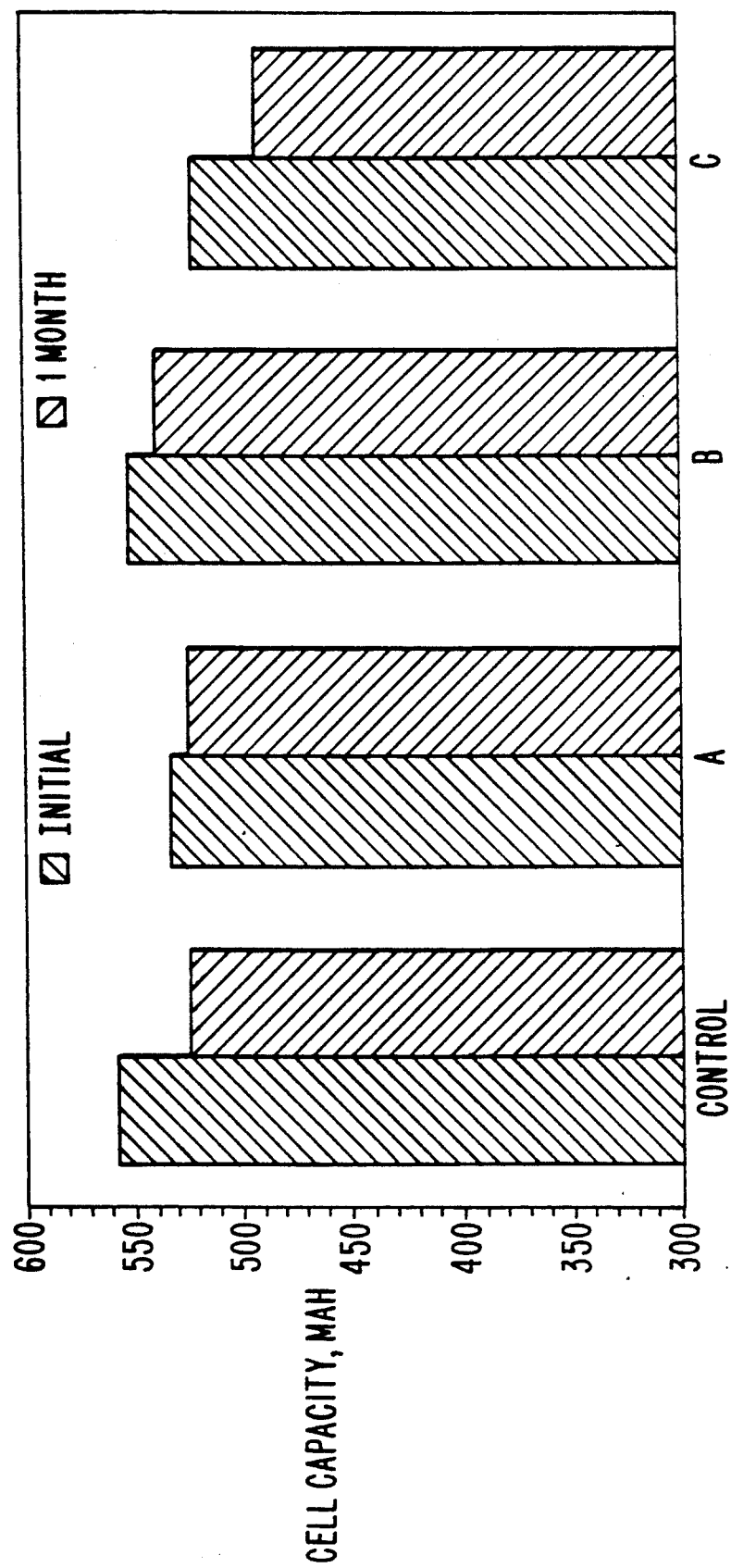

FIG. 4 also compares the capacity maintenance (150 ohm load) of a control cell with that of different lots of Test Cell Types A, B and C. The cell of the present invention containing both the fluorescent additive and the siliconate additive (0.142%) (Type B) maintained greater capacity after one month compared with the control cell, with a cell containing fluorescent additive and having no siliconate additive added (Type C) and with a cell containing siliconate additive and having no fluorescent additive (Type A).

Figure 5:
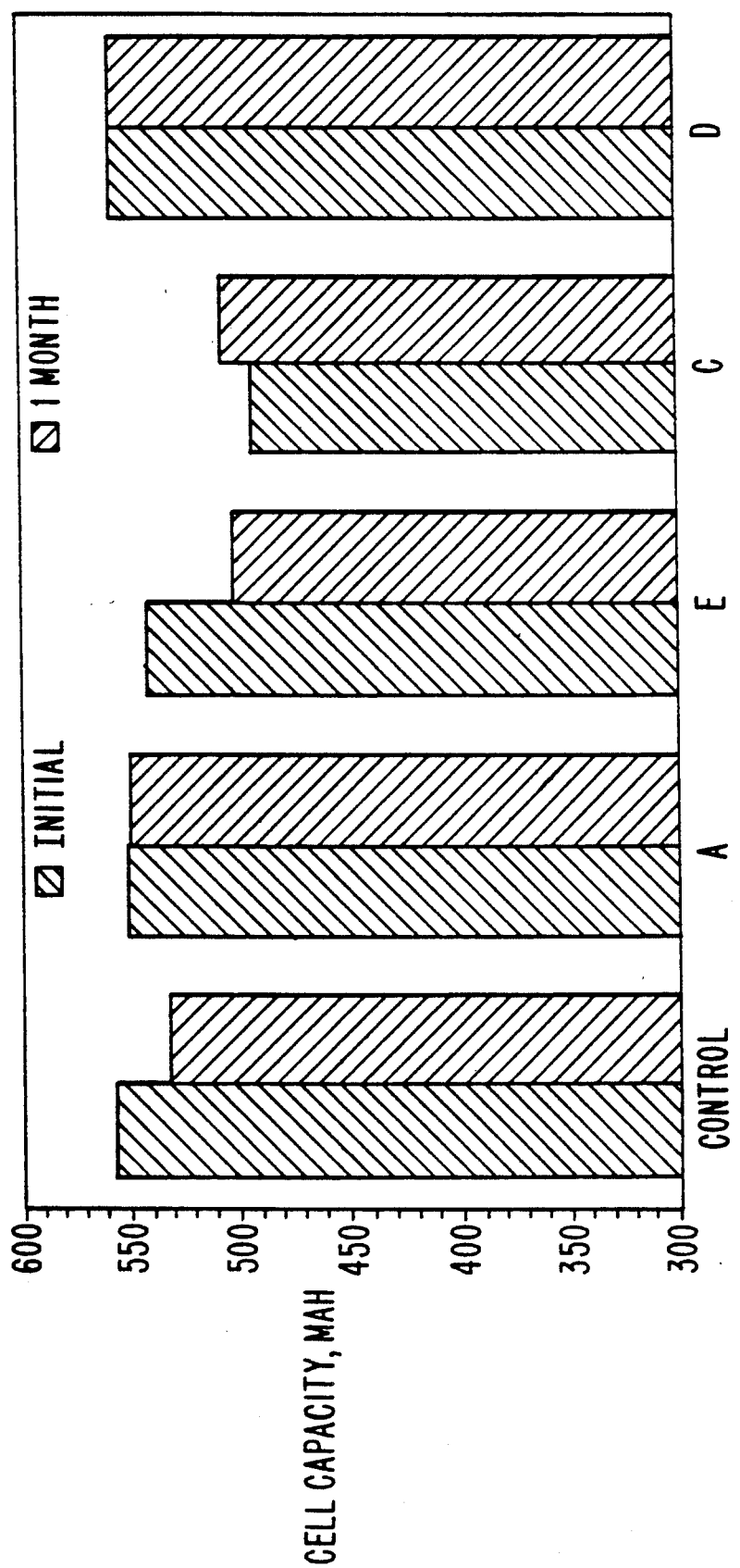

FIG. 5 compares the capacity maintenance (620 ohm load) of a control cell with that of different lots of Test Cell Types A, C, D and E. The cell of the present invention containing both the fluorescent additive and the siliconate additive (0.0355%) (Type D) maintained greater capacity after one month compared with the control cell, with a cell containing siliconate additive (0.142%) and having no fluorescent additive (Type A), with a cell containing no siliconate additive or fluorescent additive (Type E), and with a cell containing fluorescent additive and having no siliconate additive added (Type C).

FIG. 6 compares the capacity maintenance (150 ohm load) of a control cell with that of Test Cell Types A, C, D and E (same lots as FIG. 5) under different levels of relative humidity. Under all conditions, the cell of the present invention (0.0355% siliconate) (Type D) maintained greater capacity than the other cells under all conditions. FIG. 7 shows similar results for the same cells under a 620 ohm load.

From the foregoing, it will be obvious to those skilled in the art that various modifications in the above described compositions and methods can be made without departing from the spirit and scope of the invention. Accordingly the invention may be embodied in other specific forms without departing from the spirit or essential characteristics thereof. Present embodiments, therefore, are to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An electrolytic composition comprising:
   an alkaline electrolyte mixture suitable for use in an electrochemical cell; and
   a fluorescent dye or compound additive.

2. The electrolytic composition of claim 1 wherein said fluorescent additive fluoresces at a wavelength greater than 250nm.

3. The electrolytic composition of claim 1 wherein said fluorescent additive is stable at the pH of said electrolytic composition 4. The electrolytic composition of claim 3 wherein said fluorescent additive is a pyrene compound.

5. The electrolytic composition of claim 4 wherein said electrolytic composition contains 0.1% of said pyrene compound by weight.

6. The electrolytic composition of claim 4 wherein said electrolytic mixture consists of water, potassium hydroxide an zinc oxide.

7. The electrolytic composition of claim 5 wherein said electrolytic mixture contains by weight 30% potassium hydroxide and 2% zinc oxide.

8. The electrolytic composition of claim 7 wherein said electrolytic mixture also contains a siliconate additive.

9. The electrolytic composition of claim 8 wherein said siliconate additive is dimethicone copolyol.

10. An electrochemical cell comprising an electrolyte composition, said electrolyte composition comprising an alkaline electrolyte mixture suitable for use in an electrochemical cell and a fluorescent dye or compound additive.

11. An alkaline electrochemical cell comprising a cathode, a zinc anode, and an electrolyte in chemical contact with said cathode and said zinc anode, said electrolyte comprising an alkaline electrolyte mixture suitable for use in an electrochemical cell and a fluorescent dye or compound additive.

12. The electrochemical cell of claim 11 wherein said fluorescent additive fluoresces at a wavelength greater than 250 nm.

13. The electrochemical cell of claim 11 wherein said fluorescent additive is stable at the pH of said electrolytic composition.

14. The electrochemical cell of claim 13 wherein said fluorescent additive is a pyrene compound.

15. The electrochemical cell of claim 14 wherein said electrolytic composition contains 0.1% of said pyrene compound by weight.

16. The electrochemical cell of claim 14 wherein said electrolytic mixture consists of water, potassium hydroxide and zinc oxide.

17. The electrochemical cell of claim 15 wherein said electrolytic mixture contains by weight 30% potassium hydroxide and 2% zinc oxide.

18. The electrochemical cell of claim 11 wherein said electrochemical cell further comprises an organic siliconate in contact with said anode.

19. The electrochemical cell of claim 18 wherein said organic siliconate is dimethicone copolyol.

20. A method for detecting spillage or leakage of electrolyte during manufacture of an electrochemical cell, said method comprising:
   preparing an electrolytic composition, said electrolytic composition comprising an alkaline electrolytic mixture suitable for use in an electrochemical cell and a fluorescent dye or compound additive;
   adding said electrolytic composition to at least one structural component which forms said electrochemical cell;
   exposing said electrolytic composition and said structural component to a stimulus which will cause said fluorescent additive to fluorescence; and
   detecting fluorescence of said fluorescent additive.

21. The method of claim 20 wherein said fluorescence of said fluorescent additive is detected before said electrochemical cells is closed and sealed.

22. The method of claim 20 wherein said fluorescence of said fluorescent additive is detected after said electrochemical cells is closed and sealed.

* * * * *

UNITED STATES PATENT AND TRADEMARK OFFICE
CERTIFICATE OF CORRECTION

PATENT NO. : 4,999,265
DATED : March 12, 1991
INVENTOR(S) : Robert B. Dopp It is certified that error appears in the above-identified patent and that said Letters Patent is hereby corrected as shown below:

| Column | Line | |
|---|---|---|
| 1 | 44 | Before "joined" change "the" to --then--. |
| 2 | 28 | Change "cause" to --causes--. |
| 6 | 8 | Change "an" to --and--. |
| 6 | 64 | Change "cells" to --cell--. |
| 6 | 67 | Change "cells" to --cell--. |

Signed and Sealed this

First Day of December, 1992

Attest:

DOUGLAS B. COMER

*Attesting Officer*     *Acting Commissioner of Patents and Trademarks*